US006978292B1

(12) United States Patent
Murakami et al.

(10) Patent No.: US 6,978,292 B1
(45) Date of Patent: Dec. 20, 2005

(54) COMMUNICATION SUPPORT METHOD AND SYSTEM

(75) Inventors: Masahiko Murakami, Kawasaki (JP); Yasuhide Matsumoto, Kawasaki (JP); Hideto Kihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 09/666,859

(22) Filed: Sep. 21, 2000

(30) Foreign Application Priority Data

Nov. 22, 1999 (JP) .................................. 11-331576

(51) Int. Cl.[7] .......................... G06F 15/16; G06F 3/00; G06F 15/173
(52) U.S. Cl. ..................... 709/204; 715/835; 709/200; 709/224; 709/205
(58) Field of Search ............................... 709/205, 204, 709/225, 227, 200, 224; 706/15, 45; 345/835, 345/349

(56) References Cited

U.S. PATENT DOCUMENTS

| | | | | |
|---|---|---|---|---|
| 5,941,947 A | * | 8/1999 | Brown et al. ................ | 709/225 |
| 5,982,369 A | * | 11/1999 | Sciammarella et al. ...... | 345/835 |
| 5,996,011 A | * | 11/1999 | Humes ......................... | 709/225 |
| 6,065,056 A | * | 5/2000 | Bradshaw et al. ........... | 709/225 |
| 6,393,460 B1 | * | 5/2002 | Gruen et al. ................. | 709/204 |
| 6,425,012 B1 | * | 7/2002 | Trovato et al. .............. | 709/227 |
| 6,564,244 B1 | * | 5/2003 | Ito et al. ...................... | 709/204 |
| 6,633,855 B1 | * | 10/2003 | Auvenshine ................. | 706/15 |

* cited by examiner

Primary Examiner—John Follansbee
Assistant Examiner—Philip Lee
(74) Attorney, Agent, or Firm—Staas & Halsey LLP

(57) ABSTRACT

A communication support method system to ease make selection of a virtual space in a chat system. Category DB 22, which accumulates URLs and URL categories, is prepared. A URL said in a channel, its category, and the channel name are written to a URL table. The total sum of categories of URLs said in a channel becomes the channel characteristics. Channel characteristics are displayed in a window, etc. at an IRC client. After finding the total sum of URL categories, the weighting of URLs that conform to the chat contents should be immediately increased so that the channel characteristics better reflect the chat contents. For example, this includes increasing the weighting of URLs said by users who spend a long time in the channel or users who are active in sending messages. This also includes increasing the weighting of URLs which result in active chatting after the URL is said.

10 Claims, 7 Drawing Sheets

| URL | Computers | Education | Economy | Politics | Sports |
|-----|-----------|-----------|---------|----------|--------|
| URL1 | 5 | 0 | 2 | 0 | 0 |
| URL2 | 1 | 0 | 5 | 0 | 0 |
| URL3 | 0 | 5 | 1 | 1 | 1 |
| ⋮ | ⋮ | ⋮ | ⋮ | ⋮ | ⋮ |

Fig.2

| Channel Name | User Name | Entry/Exit Time | Message Volume |
|--------------|-----------|-----------------|----------------|
| #CHOCOA | MUL | 1999/10/26 10:54:50 | 14 |
|  | Pine | 1999/10/26 12:01:52 | 5 |
|  | ⋮ | ⋮ | ⋮ |

Fig.3

| Channel Name | URL | Message Sender | Time Message Sent | No. of Message | URL Characteristics ||||||
|---|---|---|---|---|---|---|---|---|---|
| | | | | | Computers | Education | Economy | Politics | Sports |
| #CHOCOA | URL1 | MUL | 1999/10/26 17:21:24 | 6 | 5 | 0 | 2 | 0 | 0 |
| | URL2 | Pine | 1999/10/26 17:18:36 | 1 | 1 | 0 | 5 | 0 | 1 |

Fig. 4

| File [illegible] Channel | | 54 |
|---|---|---|
| <MUL> CHOCOA's latest version is out | Nickname | Real Name |
| <MUL> http:// www. chocoa. org/ | MUL | Masahiko Murakami |
| <pine> Drumroll | Pine | Masahiro Matsuda |
| | Ymatsumo | Yasue Matsumoto |
| | Tao | Yoshinori Okada |
| | Kihara | Hidehito Kihara |

51

There'll be an announcement soon.

52

| | | 55 |
|---|---|---|
| Channel Name | Topic | Characteristics |
| #chocoa | CHOCOA new version release | Computers 5 |
| #kabu | Fujitsu stock price up | Economy 4 |

<#kabu:tao> Fujitsu's stock really went up

(a) Tool palette window
(b) Chat window
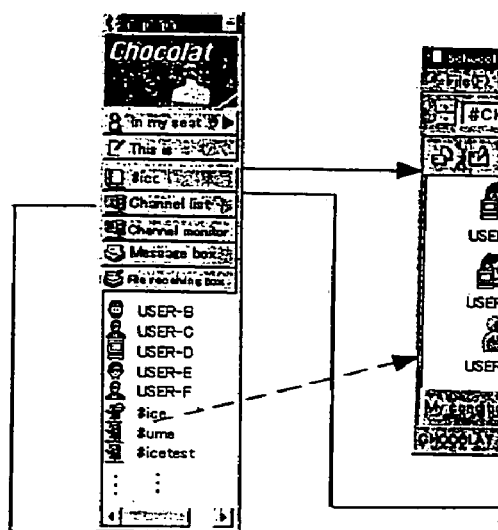
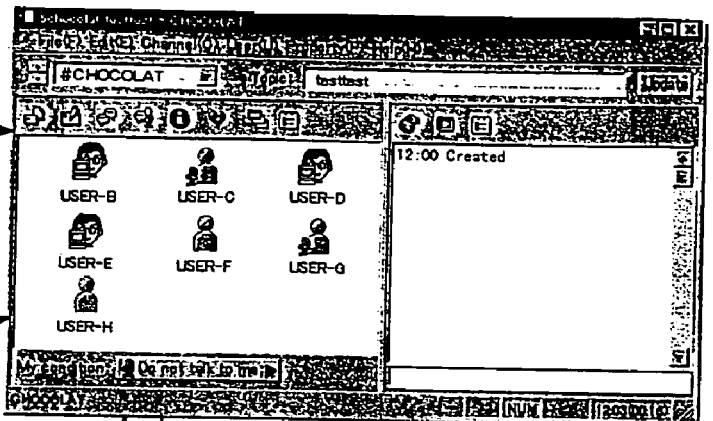
(c) Channel characteristics window
| Channel characteristics of #chocoa | |
|---|---|
| Feature | Label |
| Calculator | 5 |
| Literature | 0 |
| Economy | 3 |
| Politics | 0 |
| Sports | 0 |
(d) Channel list window
⟵ : Single click
⟵ — : Double click
(e) Channel monitor window
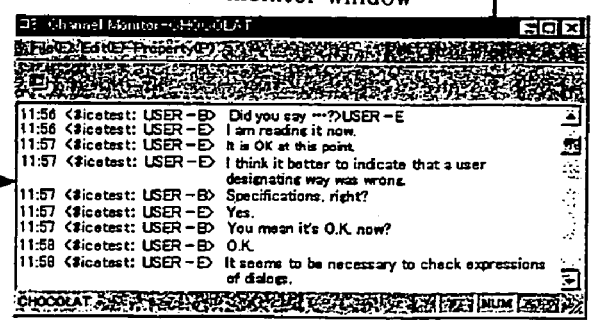
Fig.6

COMMUNICATION SUPPORT METHOD AND SYSTEM

BACKGROUND OF THE INVENTION

1. Technical Field

The present invention pertains to technology for promoting communication between users connected to a network.

A chat system in the present invention is a system structured to include a plurality of chat devices. Each chat device is connected to a network and can share a virtual chat space configured on the network. Chat devices can send and receive text messages among themselves in real time.

IRC (Internet Relay Chat) is one type of chat system structured on IRC protocol (RFC1459). IRC comprises IRC servers and IRC clients connected on the Internet. IRC clients share a virtual space known as a channel, and can send and receive text messages in real time. An IRC server broadcasts messages from an IRC client to other IRC clients in the same channel. In IRC, each IRC client is uniquely specified using an identifier known as a nickname. Each channel is given a channel name and topic. A channel name is channel identifier that uniquely identifies channel. The topic gives a summary of the chat contents in the channel.

2. Description of Related Art

The Internet has expanded rapidly, detonated by WWW (World Wide Web). In the last few years, user interest has continued to shift from simple web page viewing to inter-user communication using the Internet. The classic example of a communication tool that has been spreading rapidly lately is IRC. There are tens of thousands of channels in IRC, so a user selects and participates in channels that interest him or her. At present, the only resources available to a user to determine channel characteristics when selecting are the channel name and topic.

When a channel is created, a name is chosen for the channel that suits the issues expected to be discussed. However, if those issues change after the channel is created, the set channel name seldom changes to suit the issues. In addition, the contents or issues discussed on a channel can be set as the topic, but this too is usually not changed when the issues change. The chat contents in a channel often undergo dynamic change. However, since the channel name or topic does not usually change, the name or topic does not always match the chat contents. Consequently, the chatting often differs radically from user expectations. Therefore, a user must participate in channels one by one and view the chat contents. Consequently, searching for a suitable channel can be quite time consuming. Furthermore, sensitive issues such as minors participating in and viewing messages from explicitly sexual channels can result.

One method that has been considered is to analyze the chat contents of a channel at the server side, decide the channel characteristics, and notify the user. However, with current natural language processing technology it is difficult to analyze conversation and determine its characteristics. Even if it were possible, the cost of computer resources would be prohibitive. Furthermore, providing systems to users around the world who participate in IRC with this type of technology is not practical.

Currently, conventional chat systems including chat systems on the Internet such as IRC, etc., URLs (Uniform Resource Locator, RFC1738) frequently appear. If chatting increases after a URL is said, it would seem that the URL that was introduced is appropriate for the channel characteristics. Conversely, if the user that said the URL is kicked off the channel, it would appear that the URL was not suited for the channel.

As the Internet expands, access control services for web pages offered by WWW servers and all sorts of web page information retrieval services are being developed and provided. While performing these services, URLs are classified in specific categories. For example, various types of URL databases have been provided, ranging from directory service databases such as Yahoo, etc., to PICS (Platform for Internet Content Selection). As a result, URLs are being used as an index to indicate category.

The object of the present invention is to provide technology for encouraging communication between users, suitable for systems used by many users, easily able to detect changes in the content of chatting performed in a chat system, able to appropriately indicate chat contents to users, and ease selection of a virtual space in a chat system.

SUMMARY OF THE INVENTION

As described above, attribute-defining information is provided for a keyword such as a URL. When a keyword is included in a message said in a certain virtual space, one can say there is a high possibility that the chat contents in that virtual space are related to that keyword's attributes. The present inventor focused on the point that if this were so, it should be possible to infer the contents of chat taking place in a virtual space, without utilizing a complicated natural language analysis system and the like.

That is, in order to resolve the aforementioned problem, according to an aspect of the present invention a communication support method is provided. The method is used in a chat system. The chat system is structured to include chat devices. The chat devices are connected to a network and share any virtual chat space configured on the network. The chat devices can send and receive messages among themselves. The support method of the present invention requires:

A. Associating and preparing specific keywords with specific categories,
B. Specifying the category of the keyword wherein at least one of the keywords are included in messages sent or received in a virtual space,
C. Associating and storing keywords and the categories of the keyword with virtual space identifiers of said virtual spaces in which messages are sent or received,
D. Calculating the characteristics of the virtual spaces based on the keyword categories associated with the virtual spaces, and
E. Reporting the virtual space characteristics to users.

Using an example in which a URL is used as the keyword, a category table in which a URL is associated with a specific category is prepared in advance. An existing database (hereinafter simply "DB") can be used as the category table. When a URL is included in a message said in a virtual space, that URL category is read from the category table. Next, the virtual space identifier corresponding to the virtual space where the URL was said, the URL and the URL category are correlatively stored. In addition, the total of all URL categories corresponding to the virtual space is found, and the characteristics of the virtual space are calculated. The calculated virtual space characteristics are displayed on a PC or the like, thereby enabling a user to select a virtual space based on the chat contents.

According to another aspect of the present invention, a communication support system is used in a chat system. The support system is structured to include chat devices. The 9 chat devices are connected to a network. The chat devices share any virtual chat space operating on the network and can send and receive messages among themselves. The support system is provided with a category table, a virtual space table, a control means, a decision means, and an output means.

The category table associates and stores specific keywords with specific categories. The virtual space table associates and stores virtual space identifiers, the keywords set into the virtual spaces, and keyword categories. The control means acquires messages sent in a virtual space from the chat system. If the message includes a keyword, the control means reads a keyword category from the category table. The control means writes the virtual space identifiers of virtual spaces into which at least one of said keyword were sent, the keywords, and the keyword categories in the virtual space table. The decision means calculates the characteristics of the virtual spaces based on the keyword categories associated with the virtual spaces. The output means outputs the characteristics of the virtual spaces.

The effect is similar to that of the first mentioned aspect of the present invention.

According to another aspect of the present invention, the communication support system of the second mentioned aspect of the present invention has a virtual space table that associates and stores virtual space identifiers, keywords, keyword categories and also message times at which the aforementioned keywords were sent into the virtual spaces. In this system, the control means additionally acquires the message times of messages including keywords from the chat system. Furthermore, the control means writes the keyword message times to the virtual space table. The decision means calculates the virtual space characteristics based on the categories of the keyword in accordance with the chat volume in the virtual space from a message time until a specified time has elapsed.

The time a user says a keyword is recorded in the virtual space table. The specific time period may be set in advance on the system side, or may be a setting received from the user. A keyword category that activates chatting in a virtual space within a specified time period after message is more strongly reflected in the characteristics of the virtual space.

According to another aspect of the present invention, the communication support system of the second mentioned aspect of the present invention is additionally provided with a message volume storage means for storing the volume of messages sent from chat devices for each virtual space. The decision means calculates the virtual space characteristics based on the categories of the keyword sent by the chat devices in accordance with the message volume of chat devices in the virtual space.

The category of a keyword said by a user whose messages are active is more strongly reflected in the characteristics of the virtual space.

According to another aspect of the present invention, the communication support system of the second mentioned aspect of the present invention is additionally provided with a channel entry time storage means. The channel entry time storage means stores the times chat devices entered virtual spaces for each virtual space. In this system, the decision means calculates the virtual space characteristics based on the categories of keywords sent by a chat device in accordance with the time the chat device remained in the channel in the virtual space.

The more a keyword is said by a user who spends a long time in a virtual space, the more strongly that category is reflected in the characteristics of the virtual space. Also, if a user quickly leaves a virtual space after stating a keyword, the relevance of that keyword's category to the virtual space characteristics is lowered.

According to another aspect of the present invention the communication support system of the second mentioned aspect of the present invention has a decision means that acquires specific rights that a chat device has in regard to a virtual space from the chat system. The decision means also calculates the virtual space characteristics based on the categories of keywords sent by the chat devices in accordance with the rights of the chat devices in the virtual space.

Examples of specific rights are the right to expel another user and change the topic of conversation, for example. The category of a keyword said by a user with this right is strongly reflected in the characteristics of the virtual space.

According to another aspect of the present invention, the communication support system of the second mentioned aspect of the present invention has decision means that compares the characteristics of virtual space and keyword categories. The decision means decides whether or not to report a sent message to other chat devices in the case a message including a keyword is sent from a chat device into a virtual space. The chat system sends the message in accordance with the aforementioned decision.

That is, if a virtual space and a keyword have rather different characteristics, a message that includes that keyword is not broadcasted to other chat devices in the virtual space.

According to another aspect of the present invention the communication support system of the seventh mentioned aspect of the present invention has a decision means that instructs the chat system to expel a chat device that sent a message from a virtual space when it decides that the sent message will not be reported to other chat devices. The chat system expels the chat device that sent the message from the virtual space in accordance with the aforementioned instruction.

That is, a user who says keywords that are not suitable for the chat contents of a virtual space is expelled from the virtual space.

According to another aspect of the present invention the communication support system of the seventh mentioned aspect of the present invention has a decision means that additionally has a blacklist. The blacklist records chat device identifiers of chat devices that sent messages when the decision means determines that the sent message should not be reported to other chat devices. In addition, the decision means decides that a message will not be reported to other chat devices when the source of the message acquired from the chat system is included on the blacklist.

Therefore a user who makes messages that are not suitable for the chat contents of a virtual space is entered in a blacklist, and subsequent messages are not distributed to other users.

According to another aspect of the present invention the communication support system of the seventh mentioned aspect of the present invention has a decision means that decides whether to expel a chat device that has sent an unsuitable message from a virtual space or to report a sent message to other chat devices. These decisions are determined by analysis of the results comparing a virtual space characteristics and keyword categories.

If a keyword and a virtual space have rather different characteristics, the keyword sender can be expelled from the virtual space. If the difference between their characteristics is within an allowed range, the said message is simply not reported to other users.

According to another aspect of the present invention, the communication support system of the second mentioned aspect of the present invention has a control means that additionally acquires the message time of a message that includes at least one keyword from the chat system additionally writes the message time in the virtual space table, and deletes keywords and keyword categories from the virtual space table if a specified time that commenced at message time has elapsed.

When a rather long time elapses after a keyword is said, there is a possibility that it is not related to current chat contents. Therefore, the keyword category is deleted from the virtual space table after passage of a specific time since the keyword has said. By doing so, the characteristics of a virtual space can be calculated using fresh keywords that always reflect the current chat contents.

According to another aspect of the present invention, a computer-readable recording medium on which a communication support program is recorded is used in an information terminal capable of broadcasting a message to chat devices. The chat devices share virtual spaces configured on a network and can send and receive messages among themselves. The control program executes the following stages A through E.

A. Preparing a category table for associating and storing specific keywords with specific categories, B. Preparing a virtual space table for associating and storing virtual space identifiers, keywords sent into in virtual spaces, and keyword categories, C. Reading keyword categories from the category table and writing the virtual space identifiers of the virtual spaces into which the keywords were sent, the keywords, and the keyword categories to the virtual space table wherein a message sent into a virtual space is acquired from the chat system and the message includes at least one of said keywords, D. Calculating the characteristics of the virtual spaces based on the keyword categories associated with the virtual spaces, and E. Outputting the characteristics of the virtual spaces.

An operating effect similar to the first mentioned aspect of the present invention is realized. Examples of recording media include computer-readable floppy disks, hard disks, semiconductor memories, CD-ROM, DVD, magneto-optical disks (MO), etc.

According to another aspect of the present invention, a transmission medium transmits a communication support program that reports virtual space characteristics to chat devices. The chat devices share virtual spaces configured on a network and can send and receive messages among themselves. The control program executes the following stages A through E:

A. Preparing a category table for associating and storing specific keywords with a specific categories, B. Preparing a virtual space table for associating and storing a virtual space identifiers, keywords sent into a virtual spaces, and keyword categories, C. Reading keyword categories from the category table and writing the virtual space identifiers of the virtual spaces into which keywords were sent, the keywords, and the keyword categories to the virtual space table wherein a message sent into a virtual space is acquired from said chat system and the message includes at least one keyword, D. Calculating the characteristics of the virtual spaces based on the keyword categories associated with the virtual spaces, and E. Outputting the characteristics of the virtual spaces.

An operating effect similar to that of the first mentioned aspect of the present invention is realized. Examples of transmission media include communication media in computer network systems for transmitting and supplying program information as a transmission wave. Computer networks include LAN, the Internet, wireless communication networks, etc. Communication media include optical fiber, wireless circuits, etc.

These and other objects, features, aspects, and advantages of the present invention will become apparent to those skilled in the art from the following detailed description, which taken in conjunction with the annexed drawings, discloses preferred embodiments of the present invention.

BRIEF DESCRIPTION OF THE DRAWINGS

FIG. 2: A schematic explanatory view of the category DB.

FIG. 3: A schematic explanatory view of the user table.

FIG. 4: A schematic explanatory view of the URL table.

FIG. 5: A diagrammatical view showing channel characteristics displaying example (1).

FIG. 6: A diagrammatical view showing channel characteristics displaying example (2).

DETAILED DESCRIPTION OF THE PREFERRED EMBODIMENTS

First Embodiment

[Configuration]

Figure 1:
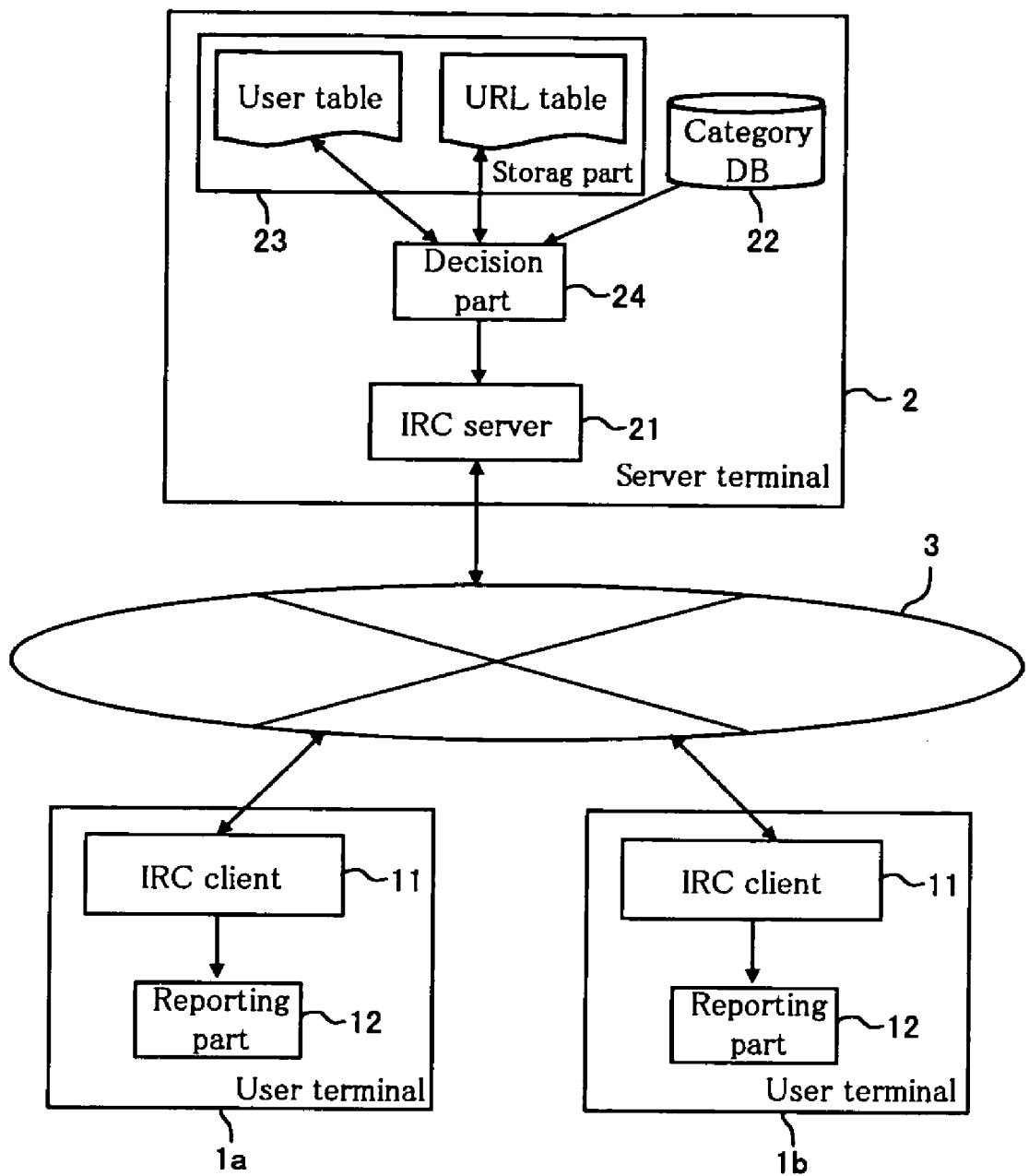
FIG. 1: An overall structural view of a communication support system related to the first embodiment.

FIG. 1 shows an overall structural view of a communication support system in accordance with the present invention. The communication support system has a plurality of user terminals 1a, 1b . . . and a server terminal 2 connected via a network 3 such as the Internet or an intranet, mobile communication network, etc. Furthermore, this embodiment is explained with an example in which the inventive communication support system is applied to IRC.

(1) Server Terminal

A server terminal 2 is provided with an IRC server 21, a category DB 22, a storage part 23, and a decision part 24. However, the category DB 22 does not have to be in the server terminal 2 as long as it can be read by the decision part 24. FIG. 2 is a schematic drawing illustrating the properties of the category DB 22. The category DB 22 accumulates URL characteristics, specifically points for each URL category, for each URL. URL points are shown for each of five categories—"computers," "education," "economy," "politics," and "sports"—in the category DB 22 shown in FIG. 2. For example, "URL1" has the most points for "computers," followed by the points for "economy."

Furthermore, how URLs are classified depends on the category DB; it is not particularly restricted. Also, keywords do not have to be URLs. Specific vocabulary terms such as "Internet" or "chat" may also be used in the category DB. A directory service database or existing database such as PICS can be used as the category DB.

The storage part 23 holds the user table and URL table created by the decision part 24. FIG. 3 is a schematic drawing explaining the user table. The user table associates and accumulates channel name, user name, channel entry time, and message volume. User name lists the nickname of a user who has entered a channel specified by a channel name. In FIG. 3, user "MUL" and user pine, have entered channel "#CHOCOA". Channel entry time lists the date and time each user entered a channel. In FIG. 3, user "MUL" is shown as having entered a channel at 10:54:50 on Oct. 26, 1999. Message volume shows the number of massages a user sent since entering the channel. For example, user "MUL" has made 14 messages since entering channel "#CHOCOA".

FIG. 4 is a schematic drawing explaining the URL table held in storage part 23. The URL table accumulates data relating to channel name, URL, message sender, message time, number of messages, and URL characteristics.

"URL" lists URLs said in a channel specified by a channel name. FIG. 4 shows that "URL1" and "URL2" have been said on channel #CHOCOA.

"Message sender" lists the nicknames of users stating the URL. FIG. 3 shows that user "MUL" said URL1, and user "pine" said URL2.

"Message time" lists the time and date a URL was said. FIG. 4 shows that URL1's message time was 17:21:24 on Oct. 26, 1999.

"Number of messages" lists the number of messages in a channel within a specific time after a URL was said. In this embodiment the specified time is set at five minutes. FIG. 4 shows that in the five minutes since URL1 was said, there were at least 6 messages.

"Characteristics" lists the URL characteristics written from the aforementioned category DB 22. In this example points are listed in each category of the originating URLs.

The decision part 24 calculates the characteristics of a channel in accordance with specific parameters based on the characteristics of URLs said in the channel. Specifically, the decision part calculates the points in each category of a channel from the total of the points in each category of URLs said in the channel.

The decision part 24 also reports the calculated channel characteristics to the IRC server. The IRC server stores points in each category for a channel together with other information related to other channels. When channel characteristics are updated or when there is a request from an IRC client, the channel characteristics stored in the IRC server are reported to the IRC client.

In addition, in this embodiment the decision part 24 assigns weightings to URLs based on the following parameters. This is done because the more suitable a URL is for the chat contents of a channel, the more its characteristics are reflected in the channel characteristics. The parameters are:

Parameter 1: Message volume
Parameter 2: Time in a channel
Parameter 3: Number of messages
Parameter 4: Channel operator attributes Weighting URL characteristics based on parameter 1, message volume, is performed as follows. Points for each URL category are added or subtracted according to the message volume of the user who said the URL, because the URL characteristics weighting of a user who is actively making messages increases. Those URL characteristics are reflected in the channel characteristics. In this embodiment addition and subtraction are performed as follows.

When (message volume)<5, $\Delta$point=0 (no change)
When (message volume)<10, $\Delta$point=1*point
When (message volume)>10, $\Delta$point=2*point Furthermore, points may be added or subtracted based on other standards, not just the number of messages made since entering a channel. For example, there is a method whereby points are added or subtracted according to how many of the last 100 messages in a channel were made by the user who said a URL. Points may also be added or subtracted according to the number of characters or bytes in a said message instead of the number of messages. In addition, there is a method whereby a comparison is made between the percentage of the number of messages by a user to the number of messages within a specific past time and a reciprocal of users in a channel. Alternatively, a comparison can be made based on certain percentage and the reciprocal of the number of users in a channel. The percentage is that of the number of messages by a user to the specific past number of messages. Points are added or subtracted according to that ratio.

Weighting URL characteristics based on parameter 2, time in a channel, is performed as follows. Points for each URL category are added or subtracted according to the time the user who said the URL stays in the channel. This is because a URL said by a user who spends a long time in a channel is considered to match the chat contents in the channel. Thus, the characteristics of that URL are reflected in the channel characteristics. In this embodiment addition and subtraction are performed as follows.

When (time spent in channel)<10 minutes, $\Delta$point=0 (no change)
When (time spent in channel)<30 minutes, $\Delta$point=1*point
When (time spent in channel)>30 minutes, $\Delta$point=2*point Weighting URL characteristics based on parameter 3, number of messages, is performed as follows. Points for each URL category are added or subtracted according to the number of times messages occur in a channel within a specific time after a URL is said. In this embodiment the specific time is 5 minutes, and addition and subtraction are performed as follows.

When (number of messages)<3, $\Delta$point=0 (no change)
When (number of messages)<10, $\Delta$point=1*point
When (number of messages)>10, $\Delta$point=2*point Furthermore, another standard can be used instead of the number of messages. For example, the standard can be the number of characters or bytes in a said message in a channel within a specific time after a URL is said.

Weighting URL characteristics based on parameter 4, channel operator attributes, is performed as follows. Points for each URL category are added or subtracted according to whether or not the user who said a URL is the channel operator. A channel operator is a user who has a set right to administer the channel in IRC. In this embodiment addition and subtraction are performed as follows.

If it's not the channel operator, $\Delta$point=0 (no change)
If it's the channel operator, $\Delta$point=1*point Furthermore, when necessary, decision part can perform URL characteristics weighting based on various other parameters in addition to the aforementioned parameters. For example, if the user who said a URL is expelled from a channel with a specific time after the message, points can be subtracted in that URL category.

(2) User Terminal

A user terminal 1 is provided with an IRC client 11 and also a reporting part 12. The reporting part 12 stores channel characteristics reported from the IRC server 21. The reporting part 12 also outputs channel characteristics, either automatically or in response to instructions from the user.

FIG. 5 shows an example of displaying channel characteristics according to the reporting part 12. The window in FIG. 5 is displayed by the IRC client 11, and has a current channel window 51, a message window 52, a channel monitor window 53, a user window 54, and a channel list window 55. The reporting part 12 displays the category with the most points and the number of points for each participating channel as the channel characteristics in the channel list window 55.

Furthermore, the current channel window 51 is the window that displays messages said in the current channel. The message window 52 is the window where an inputted message is to be said in the current channel. The channel monitor window 53 is the window that displays all of the messages said in sub channels. The user window 54 is the window for displaying the nicknames and so forth of users in the current channel. The channel list window 55 is the window for displaying a list of participating channels and specific information such as topics, etc.

Here, the current channel is the channel, among the channels in which the IRC client is participating, designated as the message target. Sub channel refers to a channel other than the current channel among the channels in which the IRC client is participating.

FIG. 6 shows an example of an alternate display of channel characteristics according to the reporting part 12. FIG. 6 is an example of displaying channel characteristics when the IRC client 11 is separately displaying a plurality of windows in accordance with user instructions. In the tool palette window (a) the user names each window (a) through (d).

Chat window (b) is a window that includes FIG. 5's current channel window 51, message window 52, and user window 54. Channel monitor window (c) and channel list window (d) are the same type of windows as channel monitor window 53 and channel list window 55 in FIG. 5 respectively.

Channel characteristics window (e) is displayed by double clicking any channel displayed in channel list window (d). The points in each category of the selected channel are displayed in this window.

[Processing Flow]

Figure 7:
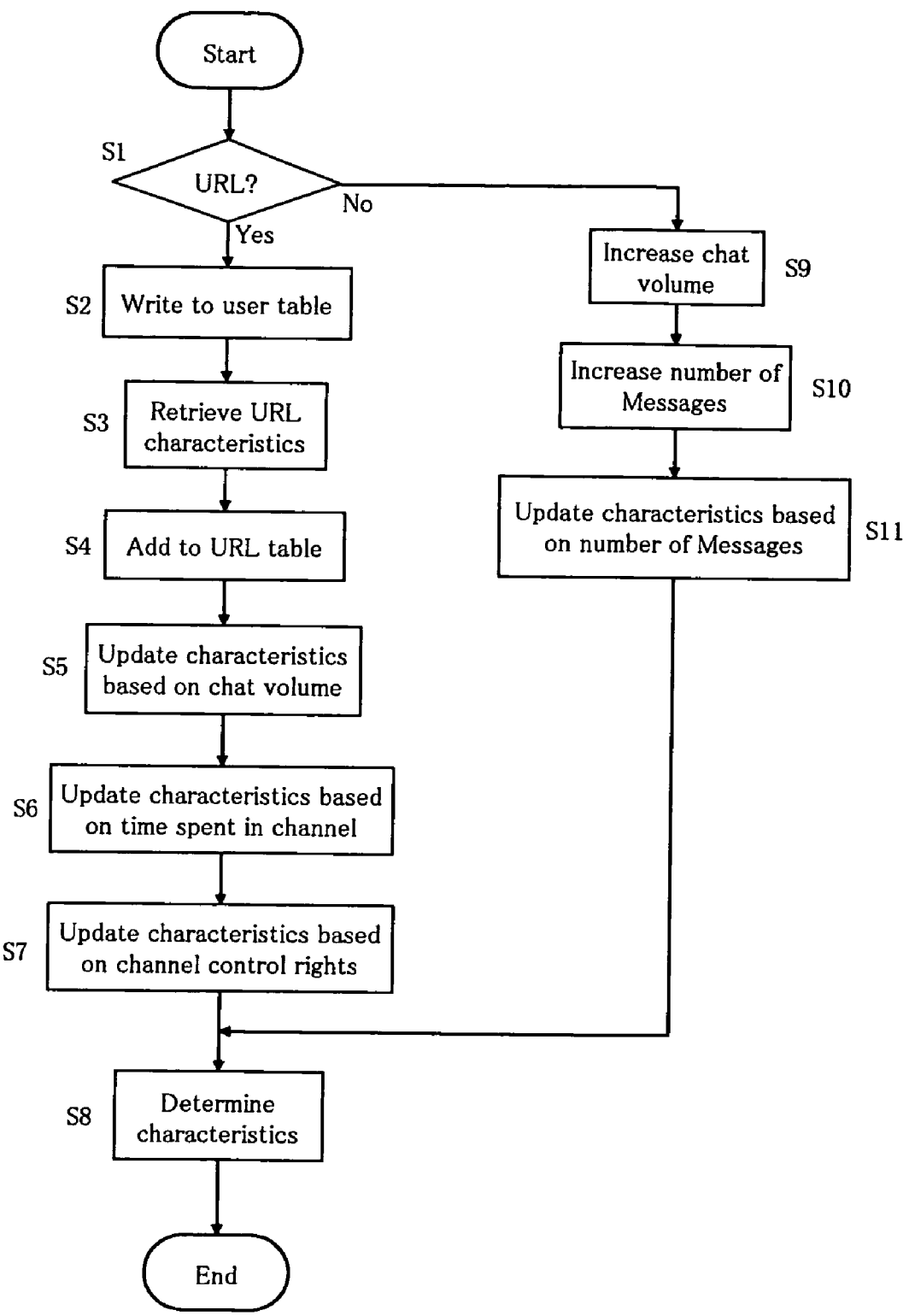
FIG. 7: A flow chart showing the flow of characteristics update processing performed by the decision part.

Next, the processing performed by the decision part 24 shall be explained in detail. FIG. 7 is a flow chart showing the flow of characteristic update processing performed by the decision part 24. The following processing starts when any IRC client says a message in any channel.

In step S1 the decision part 24 decides whether or not a URL is included in the said message. If it decides "Yes", the flow shifts to step S2. If it decides "No", the flow shifts to step S7, to be described later.

In step S2 the decision part 24 updates message volume in the user table for the user who said the message.

In step S3 the decision part 24 searches the category DB and reads the characteristics of the said URL. That is, the decision part 24 reads the points in each category of the URL from the category DB.

In step S4 the decision part 24 creates a new entry in the URL table for the channel where the URL was said, and writes the message sender, message time, and URL characteristics.

In step S5 the decision part 24 weights the URL characteristics based on message volume. That is, it reads the message volume of the URL sender from the user table and adds or subtracts URL points according to the message volume.

For example, suppose user "MUL" says "URL1". Also, suppose the user table is in the state shown in FIG. 3, and the URL table is in the state shown in FIG. 4. The number of messages by user "MUL" is 14, so "URL1" is given 2*5=10 points for "computers" and 2*2=4 points for "economy."

In step S6 the decision part 24 weights the URL characteristics based on time spent in the channel. The decision part 24 reads the time the URL sender spent in the channel from the user table, and determines the value of URL points to add or subtract according to time elapsed since entering the channel.

For example, suppose user "MUL" said "URL". Also, suppose the URL table is in the state shown in FIG. 4, and user "MUL" is in the channel for 20 minutes. In this case, the points added to "computers" for "URL1" are 1*5=5, and the points added to "economy" are 1*2=2.

In step S7 the decision part 24 weights the URL characteristics based on channel operator attributes. That is, the decision part 24 adds or subtracts URL points based on whether or not the URL sender is the channel operator. Information as to whether the user is the channel operator or not can be obtained from the IRC server.

For example, suppose user "MUL" said "URL1". Also, suppose the URL table is in the state shown in FIG. 4. If user "MUL" is the channel operator, the points for "URL1" are increased: 1*5=5 for "computers," and 1*2=2 for "economy."

In step S8 the decision part 24 calculates the characteristics of the channel where the URL was said. Specifically, the decision part 24 first adds the increased or decreased values found in steps S5 through S7 respectively to the points for the said URLs. The decision part 24 finds the weighted points. Next, the decision part 24 totals the points for all URLs associated with the target channel in the URL table in each category. The decision part 24 then displays the results and the points for each category for the channel.

For example, suppose "URL1" was said in channel #CHOCOA, and the URL table is in the state shown in FIG. 4. URL1's points are weighted as in the example in the aforementioned steps S5 through S7. URL1 has 25 points for "computers" (5+10+5+5=25) and 10 points for "economy" (2+4+2+2=10). If the points for URL1 and URL2 are added in each category, channel #CHOCOA has 26 points for "computers," 15 points for "economy," and 1 point for "sports."

In addition, the decision part 24 reports the points calculated for the channel to the IRC server 21 as the channel characteristics. The IRC server 21 reports the updated channel characteristics to the IRC client 11. As a result, the channel characteristics are displayed as in FIG. 5 or FIG. 6.

In step S1, if the decision part 24 decides that a URL is not included in the message, the flow shifts to step S9. In step S9 the decision part 24 increments the sender's message volume.

In step S10 the decision part 24 refers to the URL table and decides whether or not the URL was said in the previous five minutes before the message was said. This decision is conducted for the channel in which the message was said.

Next, the decision part 24 increments the number of URL said in the last five minutes. For example, if the message time was 17:24:24 on Oct. 26, 1999, "URL1" is found and its number of messages is incremented.

In step S11 the decision part 24 weighs the characteristics of the URL whose number was incremented based on the incremented number. For example, suppose the URL table is in the state shown in FIG. 4, and the number of "URL1" is increased. The number of "URL1" is 6. Thus, the points for "computers" increase by 1*5=5 and the points for "economy" increase by 1*2=2. Subsequently, the flow returns to the aforementioned step S8, and the channel characteristics are calculated using newly weighted URL characteristics. The updated channel characteristics are reported from the decision part 24 to the IRC server 21 in the same manner as before, and output in the format shown in FIG. 5 or FIG. 6.

Through the FIG. 7 processing, channel characteristics are calculated based on URL and reported to the user. Moreover, the characteristics of a URL that is more similar to the chat contents are more strongly reflected in the channel characteristics. Channel characteristics found in this manner automatically reflect changing chat contents. Thus, it becomes possible to display real time chat contents to the user.

Other Embodiments (A) In the processing as illustrated in the aforementioned FIG. 7, the decision part 24 can also delete an entry for a URL when a specific valid time has elapsed since the URL was said. This is desired because rather old URLs are felt not to reflect previous chat contents. Time constraints can be set in advance at the system side or by the user.

Figure 8:
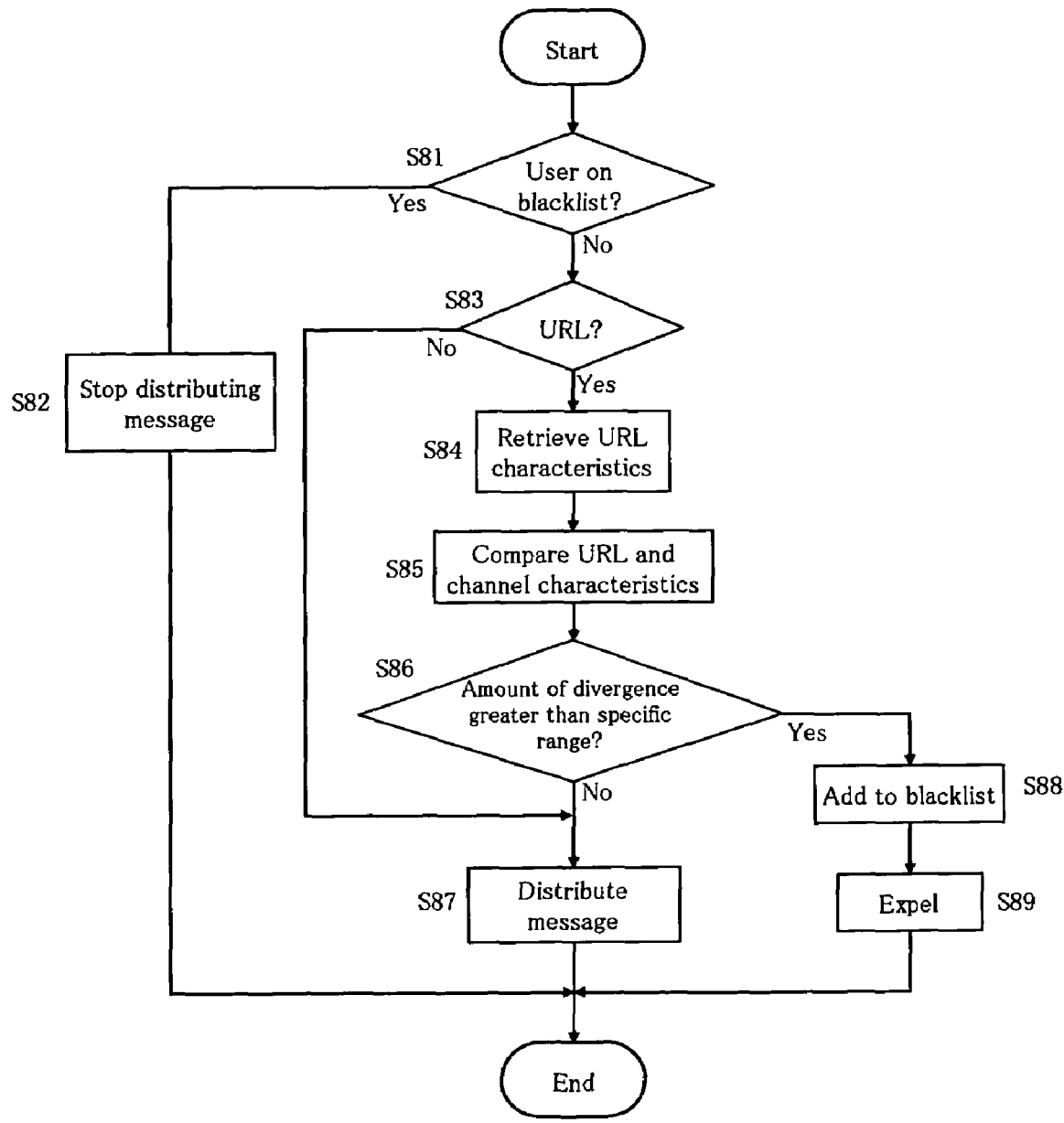
FIG. 8: A flow chart showing one example of the processing flow using channel characteristics.

(B) When channel characteristics created as described above are used, the decision part 24 can do other processing to encourage communication between users. FIG. 8 is a flow chart showing an example of processing that utilizes channel characteristics. The following processing begins when a message is said in any channel.

In step S81 the decision part 24 decides whether or not a message sender is included on the blacklist. Here the blacklist is a list created by the decision part 24; in it are written user identifiers who said URLs that are not suitable for the contents of the channel, for each channel. If the decision is "Yes", the flow shifts to step S82. If the decision is "No", the flow shifts to step S83, to be described later.

In step S82 the decision part 24 instructs the IRC server 21 to stop reporting the message to other users. The IRC server 21 follows the instruction and stops reporting the message.

In step S83 the decision part 24 decides whether or not a URL is included in the message. If it decides "Yes", the flow shifts to step S84. If it decides "No", the flow shifts to step S87, to be described later.

In step S84 the decision part 24 searches the category DB and reads the points in each category of the URL.

In step S85 the decision part 24 compares the URL characteristics and the channel characteristics. For example, the decision part 24 determines whether or not the URL category with the most points and the channel category with the most points are different. If the two do not match, the decision part 24 finds the point difference between the two in the channel category with the most points, for example.

In step S86 the decision part 24 decides whether or not the category with the most points matches the channel and URL, or decides whether or not the point difference found in the aforementioned step S85 is greater than a specific range. If it decides that the categories do not match or the specific range is exceeded, the flow shifts to step S88, to be described later. This is when the amount of divergence between channel characteristics and URL characteristics is large. If it decides that the categories match or are within the specific range, the flow shifts to step S87. This is when it decides that the channel characteristics and URL characteristics do not diverge too much.

In step S87 the decision part 24 reports the decision results to the IRC server 21. In accordance with the decision results, the IRC server 21 reports the URL to other IRC clients in the channel.

In step S88 the decision part 24 adds users who said URLs not suitable for the channel characteristics to the blacklist.

In step S89 the decision part 24 instructs the IRC server 21 to expel the user who said the unsuitable URL from the channel. In accordance with the instructions, the IRC server 21 expels the aforementioned user from the channel. Then processing ends.

In other words, the processing shown in FIG. 8 is processing that expels a user from a channel if the user says a URL that has characteristics that are greatly different from the channel characteristics. The processing subsequently controls channel participation and messages based on channel attributes so that that user's messages are not reported in the channel. Conversely, when a URL conforms to the channel characteristics, that URL is reported to other users. Therefore URL that are not suitable to the chat contents in a channel and inappropriate messages are prevented in advance by the present invention in real time, and thereby, encourage smoother communication.

Also, the processing may be altered according to the amount of divergence between channel characteristics and URL characteristics found in step S86. For example, if the difference between URL points in the channel category with the most points is greater than a specific range, the URL sender is expelled from the channel. If the point difference is within the specific range, a message that includes the URL is simply not reported to other users.

(C) The following sort of method can be considered as a method of supporting communication between users using channel characteristics.

When a user's characteristics are prepared in advance, it is possible to restrict user participation in a channel based on the user characteristics and the channel characteristics. User characteristics are created by correlatively storing the categories of a URL said by a user and a user identifier, for example. If a user for whom the difference between channel characteristics and user characteristics exceeds a specific range attempts to enter a channel, the entry request can be denied. Conversely, a user whose user characteristics are similar to the channel characteristics is welcomed to the channel, and chatting can flourish.

(D) The aforementioned embodiments were explained for cases in which the communication support system of the present invention was applied to IRC. However, the present invention can be applied to other chat systems in the same way.

(E) Included in the present invention, the recording medium on which the program is recorded executes the inventive processing described herein. Examples of recording media include computer-readable floppy disks, hard disks, semiconductor memories, CD-ROM, DVD, magneto-optical disks (MO), etc.

(F) Also included in the present invention is a transmission medium that transmits the program that executes the inventive processing described herein. Examples of transmission media include communication media in computer network systems for transmitting and supplying program information as a transmission wave. Computer networks include LAN, the Internet, wireless communication networks, etc. Communication media include optical fiber, wireless circuits, etc.

Utilizing the present invention in a chat system in which a plurality of users participates makes it possible to report the gradually changing chat contents in a virtual space to users in accordance with the changes. The characteristics of a virtual space are calculated based on the chat contents themselves, so even if the chat contents change, characteristics reflecting the real time chat contents can be reported to users.

While these embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A communication support method used in a chat system structured to include chat devices connected to a network and which share virtual chat spaces configured on said network and which can send and receive messages among themselves, comprising:
   associating and preparing specific keywords with specific keyword categories prior to recording a message volume, wherein messages sent or received in a virtual chat space have at least one of said specific keywords;
   associating and storing said specific keywords and said specific keyword categories with virtual chat space identifiers of said virtual chat spaces;
   calculating virtual chat space characteristics of said virtual chat spaces based on said specific keyword categories associated with the virtual chat spaces, the virtual chat space characteristics including a tabulation of relevance points associated with at least one of the specific keyword categories; and
   reporting said virtual chat space characteristics to users of said chat devices by displaying at least one of a specific keyword category having a highest tabulation of relevance points and a list of highest relevance point tabulations associated with a plurality of the specific keyword categories,
   wherein the message volume is recorded during a period of time after a message having at least one of the specific keywords is sent in the virtual chat space;
   wherein the recorded message volume having at least one of the specific keywords is proportional to an amount of interest of at least one user participating in the virtual chat space; and
   wherein the virtual chat space characteristics are calculated based on the total of at least the relevance points associated with said specific keyword category weighted by the recorded message volume and by the period of time a chat device that sent or received a message having at least one of the specific keywords remains in the virtual chat space.

2. A communication support system used in a chat system structured to include chat devices connected to a network and which share virtual chat spaces configured on said network and which can send and receive messages among themselves, comprising:
   a category table for associating and storing specific keywords with specific keyword categories prior to recording a message volume;
   a virtual chat space table for associating and storing virtual chat space identifiers, said specific keywords sent into said virtual chat spaces, and said specific keyword categories;
   a control means for reading said specific keyword categories from said category table and for writing the virtual chat space table said virtual chat space identifiers of said virtual chat spaces into which at least one of said specific keywords were sent, said specific keywords, and said specific keyword categories, wherein a message sent into virtual chat space is acquired from said chat system and said message has at least one of said specific keywords;
   a decision means for calculating virtual chat space characteristics of said virtual chat space based on said specific keyword categories associated with the virtual chat spaces, the virtual chat space characteristics including a tabulation of relevance points associated with at least one of the specific keyword categories; and
   an output means for outputting said characteristics of said virtual chat spaces by displaying at least one of the specific keyword category having a highest tabulation of relevance points and a list of highest relevance point tabulations associated with a plurality of the specific keyword categories,
   wherein the message volume is recorded during a period of time after a message having at least one of the specific keywords is sent in the virtual chat space;
   wherein the recorded message volume having at least one of the specific keywords is proportional to an amount of interest of at least one user participating in the virtual chat space; and
   wherein the virtual chat space characteristics are calculated based on the total of at least the relevance points associated with said specific keyword category weighted by the recorded message volume and by the period of time a chat device that sent or received a message having at least one of the specific keywords remains in the virtual chat space.

3. The communication support system of claim 2, wherein said communication support system is additionally provided with a message volume storage means for storing message volume determined from a volume of messages sent from chat devices for each virtual space; and
   said decision means calculates said virtual space characteristics based on said keyword categories sent by chat devices in accordance with said message volume of chat devices in said virtual spaces.

4. The communication support system of claim 2, wherein said decision means acquires specific rights that a chat device has in regard to a virtual space from the chat system, and calculates said virtual space characteristics based on said keyword categories sent by said chat devices in accordance with the rights of said chat devices in said virtual spaces.

5. The communication support system of claim 2, wherein said decision means compares said virtual spaces characteristics and a keyword category and decides whether or not to report a message to other chat devices wherein said message including a keyword is sent from a chat device into a virtual space; and said chat system sends the message in accordance with said decision.

6. The communication support system of claim 5, wherein decision means instructs the chat system to expel a chat device that sent an unsuitable message from a virtual space upon deciding that said message will not be reported to other chat devices; and said chat system expels said chat device that sent said message from said virtual space in accordance with said instruction.

7. The communication support system of claim 5, wherein said decision means additionally has a blacklist that records chat devices that sent unsuitable messages wherein said decision means decided that said messages would not be reported to other chat devices, said decision means decides that said messages will not be reported to other chat devices wherein the sending sources of said messages acquired from the chat system are included on said blacklist.

8. The communication support system of claim 5, wherein said decision means decides whether to expel a chat device that sent an unsuitable message from a virtual space or to report a sent message to other chat devices based on the results of comparing virtual space characteristics and a keyword category.

9. The communication support system of claim 2, wherein said control means additionally acquires a message time of a message that includes at least one of said keyword from said chat system, and additionally writes said message time to said virtual space table, and deletes said keywords and keyword categories from said virtual space table wherein a specified time has elapsed since said message time.

10. A computer-readable recording medium on which is a recorded communication support program used in an information terminal capable of broadcasting a message to chat devices which share virtual chat spaces configured on a network and can send and receive messages among themselves, the control program executing the stages comprising:

preparing a category table for associating and storing specific keywords with specific keyword categories prior to recording a message volume;

preparing a virtual chat space table for associating and storing virtual chat space identifiers of said virtual chat spaces, said specific keywords sent into said virtual chat spaces, and said specific keyword categories;

reading said specific keyword categories from said category tables and writing to the virtual chat space table said virtual chat space identifiers of said virtual chat spaces into which said specific keywords were sent, said specific keywords, and said specific keyword categories, wherein a message sent in virtual chat space is acquired from said chat system and the message has at least one of said specific keywords;

calculating virtual chat space characteristics of said virtual chat spaces based on said specific keyword categories associated with said virtual chat spaces, the virtual chat space characteristics including a tabulation of relevance points associated with at least one of the specific keyword categories; and outputting said characteristics of said virtual chat spaces by displaying at least one of the specific keyword category having a highest tabulation of relevance points and a list of highest relevance point tabulations associated with a plurality of the specific keyword categories, wherein the message volume is recorded during a period of time after a message having at least one of the specific keywords is sent in the virtual chat space;

wherein the recorded message volume having at least one of the specific keywords is proportional to an amount of interest of at least one user participating in the virtual chat space; and wherein the virtual chat space characteristics are calculated based on the total of at least the relevance points associated with said specific keyword category weighted by the recorded message volume and by the period of time a chat device that sent or received a message having at least one of the specific keywords remains in the virtual chat space.

* * * * *